|  US008145207B2 |

(12) United States Patent
Hwang et al.

(10) Patent No.: US 8,145,207 B2
(45) Date of Patent: Mar. 27, 2012

(54) APPARATUS AND METHOD FOR AVOIDING INTERFERENCE BETWEEN BASE STATION AND RELAY STATION WHEN USING FULL DUPLEX RELAY IN A MULTI HOP RELAY SYSTEM

(75) Inventors: Sung-Soo Hwang, Yongin-si (KR); Jin-Ghoo Choi, Seoul (KR); Chi-Hyun Park, Suwon-si (KR); Sang-Boh Yun, Seongnam-si (KR); Seung-Hee Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 12/378,885

(22) Filed: Feb. 20, 2009

(65) Prior Publication Data

US 2009/0286546 A1 Nov. 19, 2009

(30) Foreign Application Priority Data

Feb. 22, 2008 (KR) ........................ 10-2008-0016219

(51) Int. Cl.
*H04W 24/00* (2009.01)
(52) U.S. Cl. ...................... 455/423; 455/67.13; 455/450; 455/509; 455/515; 370/329; 370/332; 375/144
(58) Field of Classification Search ............. 455/7, 11.1, 455/63.1, 67.13, 463, 115.3, 134, 135, 161.3, 455/226.2, 226.3, 277.2, 278.1, 452.2, 464, 455/513; 370/280, 293, 294, 315, 225, 226, 370/227, 328, 329, 332, 338, 341; 375/144, 375/146, 147, 148
See application file for complete search history.

(56) References Cited

U.S. PATENT DOCUMENTS

| 7,177,644 | B2 * | 2/2007 | Smith et al. ..................... 455/445 |
| 7,184,703 | B1 * | 2/2007 | Naden et al. ..................... 455/10 |
| 7,400,888 | B2 * | 7/2008 | Smith et al. ................. 455/452.1 |
| 7,574,179 | B2 * | 8/2009 | Barak et al. ..................... 455/101 |
| 7,646,752 | B1 * | 1/2010 | Periyalwar et al. ........... 370/338 |
| 7,738,835 | B2 * | 6/2010 | Oh et al. ............................ 455/7 |
| 7,865,146 | B2 * | 1/2011 | Hart ............................ 455/67.13 |
| 7,873,002 | B2 * | 1/2011 | Cai ............................... 370/329 |
| 7,920,826 | B2 * | 4/2011 | Kim et al. ......................... 455/16 |
| 2007/0104127 | A1 * | 5/2007 | Suh et al. ........................ 370/328 |
| 2007/0153758 | A1 * | 7/2007 | Kang et al. ..................... 370/338 |
| 2008/0070510 | A1 * | 3/2008 | Doppler et al. ................. 455/69 |
| 2008/0080436 | A1 * | 4/2008 | Sandhu et al. ................. 370/338 |
| 2008/0219275 | A1 * | 9/2008 | Boariu et al. ................. 370/401 |
| 2008/0267110 | A1 * | 10/2008 | Cai et al. ........................ 370/315 |
| 2008/0274746 | A1 * | 11/2008 | Lin et al. ........................ 455/449 |
| 2009/0203320 | A1 * | 8/2009 | Horn et al. ..................... 455/63.1 |
| 2009/0253447 | A1 * | 10/2009 | Pi et al. .......................... 455/501 |
| 2010/0034134 | A1 * | 2/2010 | Larsen ........................... 370/315 |

* cited by examiner

*Primary Examiner* — Kamran Afshar
*Assistant Examiner* — Gerald Oliver (57) ABSTRACT

An apparatus and method for avoiding interference between a base station and a relay station when using full duplex relay in a multi-hop relay wireless communication system are provided. An operation of a mobile station includes measuring an strength of a receive signal from a base station and an strength of a receive signal from an relay station, calculating a receive signal strength ratio of base station to relay station by dividing the strength of the receive signal from the base station by the strength of the receive signal from the relay station, determining if interference occurs using the receive signal strength ratio, and transmitting a control message representing if interference occurs.

20 Claims, 7 Drawing Sheets

APPARATUS AND METHOD FOR AVOIDING INTERFERENCE BETWEEN BASE STATION AND RELAY STATION WHEN USING FULL DUPLEX RELAY IN A MULTI HOP RELAY SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Feb. 22, 2008 and assigned Ser. No. 10-2008-0016219, the contents of which are herein incorporated by reference.

TECHNICAL FIELD OF THE INVENTION

The present invention relates generally to a multi-hop relay wireless communication system. More particularly, the present invention relates to an apparatus and method for, when a Mobile Station (MS) is located in a cell boundary between a Base Station (BS) and a Relay Station (RS), avoiding interference between the BS and the RS when using Full Duplex Relay (FDR) in a multi-hop relay wireless communication system.

BACKGROUND OF THE INVENTION

In the $4^{th}$ Generation (4G) communication system, that is the next generation communication system, intensive research is being conducted to provide users with services having various Qualities of Service (QoSs) using a data rate of about 100 Mbps. In particular, in the 4G communication system, study is now made to support high-speed services in the way of guaranteeing mobility and QoS for a Broadband Wireless Access (BWA) communication system such as a wireless Local Area Network (LAN) system and a wireless Metropolitan Area Network (MAN) system. Also, the typical 4G communication system is an Institute of Electrical and Electronics Engineers (IEEE) 802.16 communication system.

The IEEE 802.16 communication system is a communication system applying Orthogonal Frequency Division Multiplexing (OFDM)/Orthogonal Frequency Division Multiple Access (OFDMA) to support a broadband transmission network for a physical channel of the wireless communication system. Active research has been conducted to guarantee the mobility of an MS and the flexibility of wireless networking in the IEEE 802.16 communication system and provide service more efficiently under a wireless environment experiencing great changes in traffic distribution or required calls. As one method among them, a communication system applying a multi-hop relay data forward scheme using an RS is taken into consideration.

A use of the RS in the broadband wireless communication system results in effects of an increase of coverage of a BS, throughput improvement, etc. That is, the broadband wireless communication system can improve a throughput by locating an RS in a specific area having poor channel environment. Also, the broadband wireless communication system can provide a service to enable communication between an MS out of the coverage of a BS and the BS by locating an RS near a cell boundary.

Figure 1A:
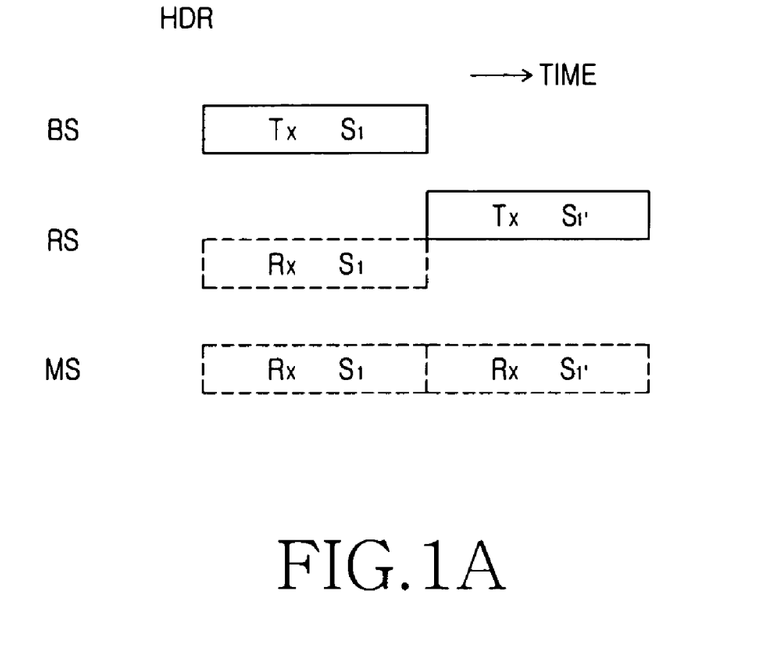
FIGS. 1A and 1B are diagrams illustrating transmit/receive processes of half duplex relay and full duplex relay according to the conventional art.

As shown in FIG. 1A, in a general relay system, a channel resource for signal transmission from a BS to an RS is separated from a channel resource for signal transmission from the RS to an MS. For example, if a channel resource is separated in time, transmission from an RS to an MS is performed after transmission from a BS to the RS is performed. FIG. 1A shows a Half Duplex Relay (HDR) wherein resources are separated in time axis. In FIG. 1A, one square means one channel, a solid line square represents a transmission duration, and a dotted line square represents a reception duration. In view of an RS, HDR divides a channel resource for use and thus the frequency efficiency of the whole system is low. Unlike HDR, Full Duplex Relay (FDR) uses the same channel resource for each transmission between a BS and an RS and between the RS and an MS and, thus, the frequency efficiency is higher than HDR.

Figure 1B:
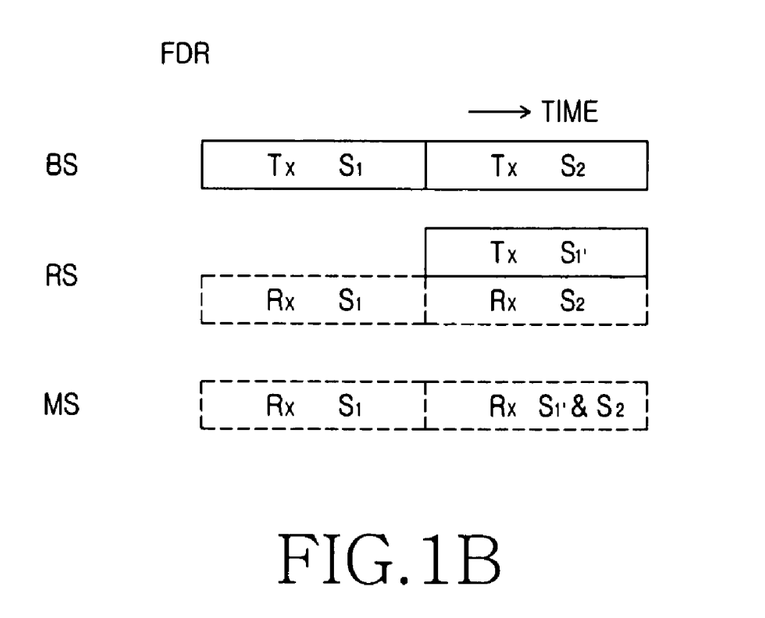
Figure 2:
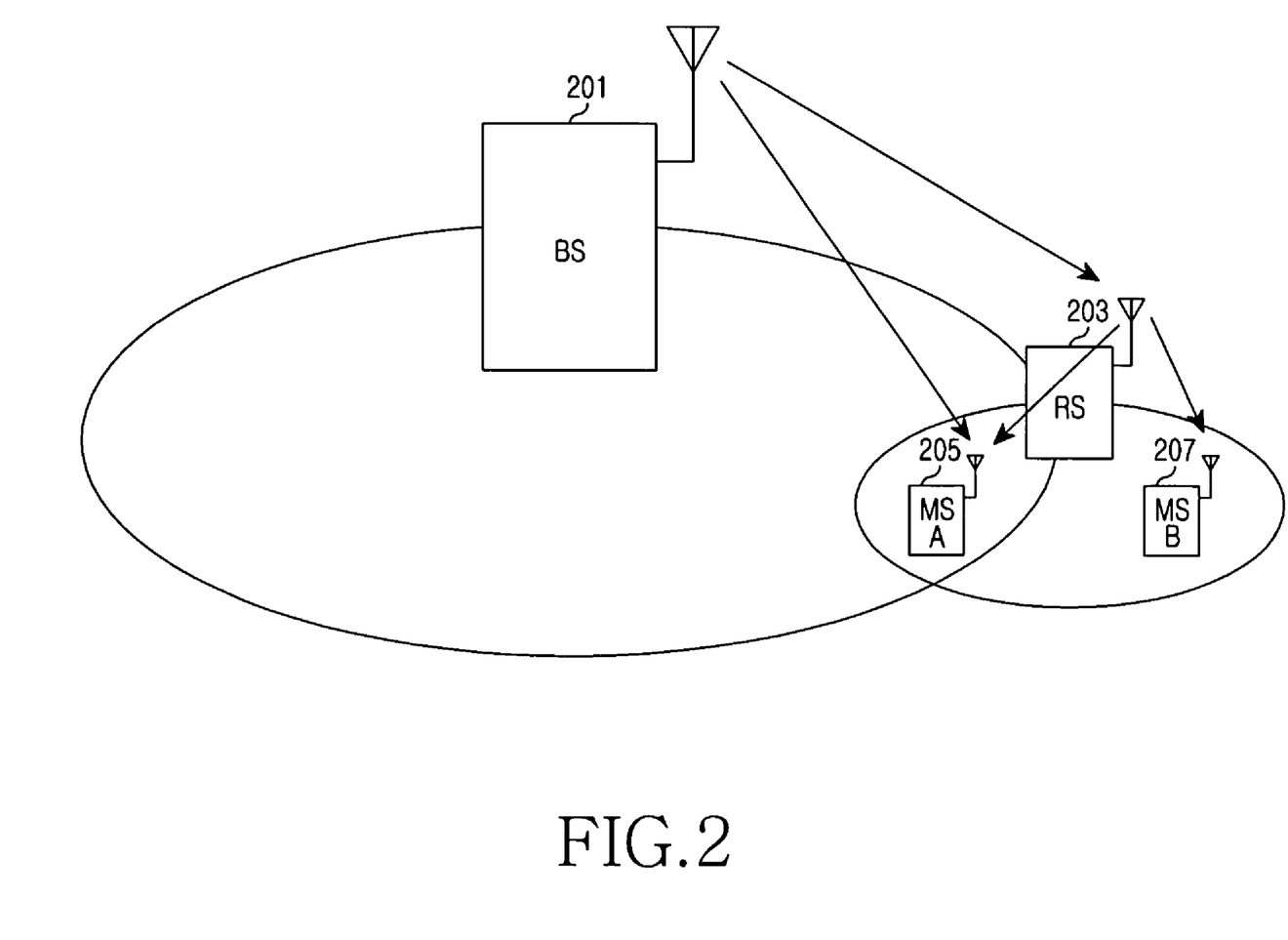
FIG. 2 is a diagram illustrating a mobile communication system in which a mobile station A is located in an area where interference occurs and an mobile station B is located in an area where no interference occurs.

Referring to FIG. 1B, FDR has a great possibility to cause interference in communication of an MS compared to an HDR system. In the HDR of FIG. 1A, frequency efficiency is low but, because only an RS or a BS transmits a signal for the same channel resource during a relay process, an MS does not have to consider interference from the RS. However, if adopting FDR to overcome a decrease of frequency efficiency, a transmit signal between a BS and an RS occupies the same channel resource as in FIG. 1B. The influence of interference occurring due to the BS and the RS using the same channel resource is different depending on relative positions of a BS 201, an RS 203, and MSs 205 to 207 as shown in FIG. 2. In FIG. 2, the MSs 205 and 207 are in connection to the RS 203. With respect to the MS B 207, located out of cell coverage of the BS 201, interference from the BS 201 does not matter. However, in the case of the MS A 205, if a received signal ratio of the MS A 205 from the BS 201 and the RS 203 increases more than any level depending on a relative position, etc., interference occurs and, thus, a quality of relay communication is deteriorated.

As described above, there is a problem that, when applying HDR, a transmit signal of a BS and a transmit signal of an RS occupy the same channel resource, thus causing interference.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for minimizing cell interference between a base station and a relay station for a mobile station when using frill duplex relay in a multi-hop relay wireless communication system.

Another aspect of the present invention is to provide an apparatus and method for determining if interference occurs when using FDR in a multi-hop relay wireless communication system.

The above aspects are achieved by providing an apparatus and method for avoiding interference between a BS and an RS when using FDR in a multi-hop relay wireless communication system.

According to one aspect of the present invention, an operation method of a MS in a multi-hop relay wireless communication system is provided. The method includes measuring an strength of a received signal from a BS and an strength of a received signal from an RS, calculating a received signal strength ratio of BS to RS by dividing the strength of the received signal from the BS by the strength of the received signal from the RS, determining if interference occurs using the received signal strength ratio, and transmitting a control message representing if interference occurs.

According to another aspect of the present invention, an operation method of a RS in a multi-hop relay wireless communication system is provided. The method includes determining if interference occurs using a control message comprising interference information received from a MS, reallocating resources to the MS if interference occurs, and performing communication with the MS through the reallocated resources.

According to a further aspect of the present invention, a MS apparatus in a multi-hop relay wireless communication system is provided. The apparatus includes a measurer, a determiner, and a transmitter. The measurer measures an strength of a received signal from a BS and an strength of a received signal from an RS. The determiner calculates a received signal strength ratio of BS to RS by dividing the strength of the received signal from the BS by the strength of the received signal from the RS, and determines if interference occurs using the received signal strength ratio. The transmitter transmits a control message representing if interference occurs.

According to a further another aspect of the present invention, an RS apparatus in a multi-hop relay wireless communication system includes an allocator and a transmitter. The allocator determines if interference occurs using a control message including interference information received from a MS, and reallocates resources to the MS if interference occurs. The transmitter transmits a signal to the MS through the reallocated resources.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A method and apparatus for minimizing interference when using full duplex relay in a multi-hop relay wireless communication system according to an exemplary embodiment of the present invention are described below. In an exemplary embodiment of the present invention, an OFDM/OFDMA wireless communication system is, for example, described below, but the present invention is also applicable to other wireless communication systems.

Figure 3:
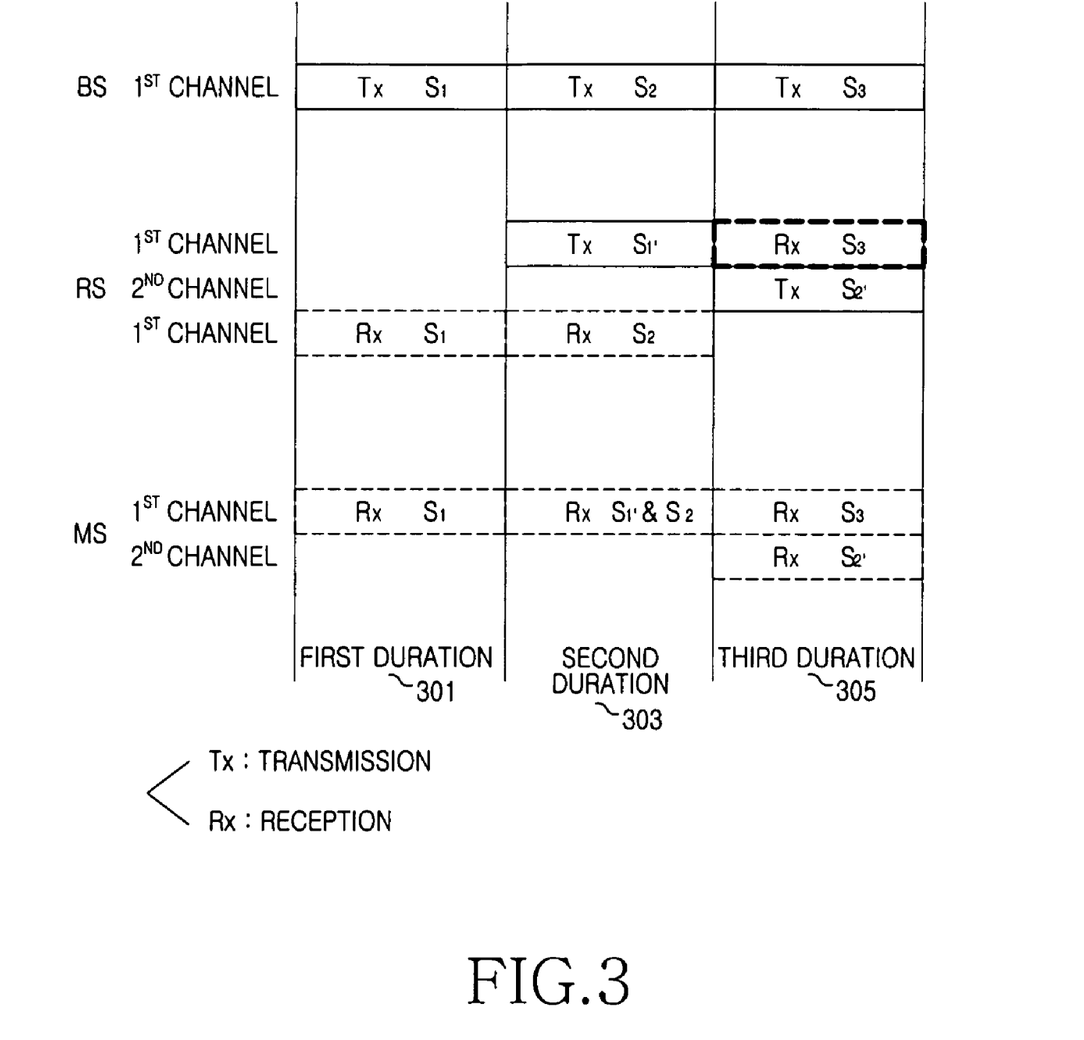
FIG. 3 is a diagram illustrating a transmit/receive process of a full duplex relay scheme for minimizing interference in a multi-hop relay wireless communication system according to an exemplary embodiment of the present invention.

FIG. 3 is a diagram illustrating a transmit/receive process of an FDR scheme for minimizing interference in a multi-hop relay wireless communication system according to an exemplary embodiment of the present invention. In FIG. 3, a solid line square represents a transmission duration and a dotted line square represents a reception duration.

Referring to FIG. 3, in a first duration 301, a BS transmits a signal $s_1$ to an RS and a MS over a $1^{st}$ channel. The RS and the MS receive the signal $s_1$ from the BS over the $1^{st}$ channel.

In a second duration 303, the BS transmits a signal $s_2$ to the RS and the MS over the $1^{st}$ channel. The RS receives the signal $S_2$ from the BS over the $1^{st}$ channel, changes the signal $s_1$ received from the BS in the first duration 301 into a signal $s_1'$, and transmits the signal $s_1'$ to the MS over the $1^{st}$ channel. The change means that, by demodulating and again modulating a signal by the RS, data included is the same but a modulation scheme is changed. The MS receives the signal $s_2$ from the BS over the $1^{st}$ channel and receives the signal $s_1'$ from the RS over the $1^{st}$ channel. In view of the MS, the signal $s_1'$ and the signal $s_1'$ share the same channel, thus causing interference. Accordingly, the MS transmits interference information to the RS. The interference information means a control message including information on interference.

In a third duration 305, the BS transmits a signal $s_3$ to the RS and the MS over the $1^{st}$ channel. The RS receives the signal $s_3$ from the BS over the $1^{st}$ channel and, upon recognizing interference through the interference information, identifies map information of the BS. The RS transmits the signal $s_2'$ to the MS having sent the interference information through a vacant resource block not currently allocated by the BS. In FIG. 3, the vacant resource block is a $2^{nd}$ channel. The MS simultaneously receives the signal $S_3$ and the signal $S_2'$ without interference by receiving the signal $S_3$ from the BS over the $1^{st}$ channel and receiving the signal $S_2'$ from the RS over the $2^{nd}$ channel.

Figure 4:
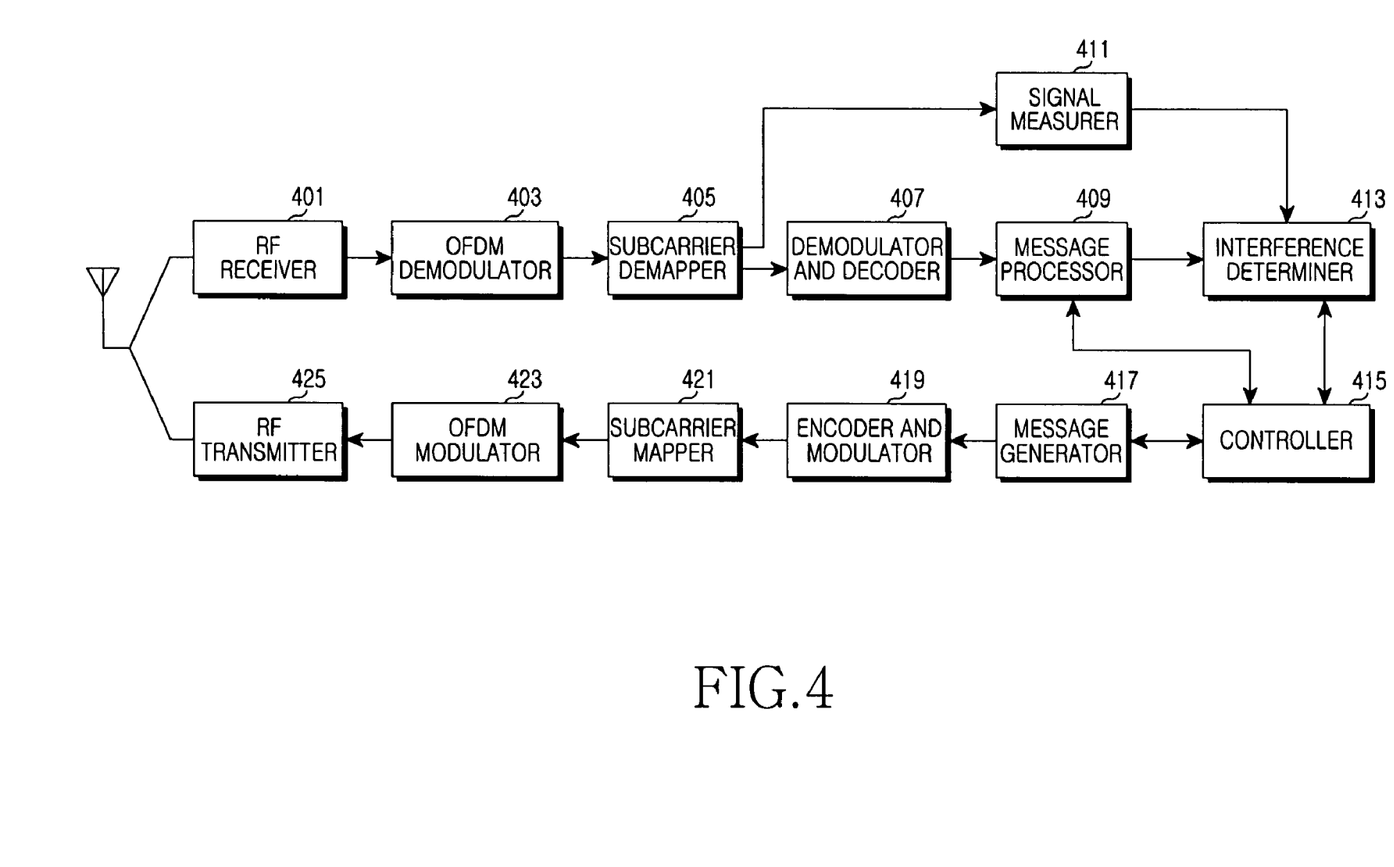
FIG. 4 is a block diagram illustrating a construction of an mobile station in an full duplex relay scheme for minimizing interference in a multi-hop relay wireless communication system according to an exemplary embodiment of the present invention.

FIG. 4 is a block diagram illustrating a construction of an MS in a multi-hop relay wireless communication system according to an exemplary embodiment of the present invention.

As shown in FIG. 4, the MS includes a Radio Frequency (RF) receiver 401, an OFDM demodulator 403, a subcarrier demapper 405, a demodulator and decoder 407, a message processor 409, a signal measurer 411, an interference determiner 413, a controller 415, a message generator 417, an encoder and modulator 419, a subcarrier mapper 421, an OFDM modulator 423, and an RF transmitter 425.

The RF receiver 401 down converts an RF band signal received through an antenna into a baseband signal. The OFDM demodulator 403 distinguishes the signal provided from the RF receiver 401 in an OFDM symbol unit, removes a Cyclic Prefix (CP), and then restores signals by subcarrier through a Fast Fourier Transform (FFT) operation. The subcarrier demapper 405 extracts signals to be demodulated and decoded among the signals by subcarrier provided from the OFDM demodulator 403. The demodulator and decoder 407 converts the signals into a bit stream by demodulating and decoding the signals provided from the subcarrier demapper 405. The message processor 409 analyzes messages within the bit stream provided from the demodulator and decoder 407, identifies information included in the message, and provides the identified information to the controller 415.

The signal measurer 411 measures a strength of a received signal from a BS and a strength of a received signal from an RS using the signal provided from the subcarrier demapper 405, and provides the measured strength values of the received signals to the interference determiner 413.

The interference determiner 413 calculates a received signal strength ratio of BS to RS using the strength of the received signal from the BS and the strength of the received signal from the RS provided from the signal measurer 411. If the received signal strength ratio is equal to or more than a predetermined threshold value, the interference determiner 413 determines that interference occurs, and informs the controller 415 of interference or non-interference.

The controller 415 performs a overall control for communication of an MS. For example, the controller 415 provides information representing interference or non-interference, which is identified through the received signal strength ratio, to the message generator 417. That is, the controller 415 identifies interference or non-interference using the information provided from the interference determiner 413, manages an available radio resource status, and controls the subcarrier demapper 405, the demodulator and decoder 407, the message processor 409, the message generator 417, the encoder and modulator 419, and the subcarrier mapper 421.

The message generator 417 generates messages under the control of the controller 415. Particularly, the message generator 417 generates a flag message including information for determining interference or non-interference, and outputs the flag message to the encoder and modulator 419. The flag message is one example of a control message including information for informing interference or non-interference and is a message of one bit having '0' or '1'. However, the flag message can be substituted with a control message of a different type according to another exemplary embodiment of the present invention.

The encoder and modulator 419 converts the bit stream into complex symbols by encoding and modulating the bit stream provided from the controller 415. The subcarrier mapper 421 maps the complex symbols, which are provided from the encoder and modulator 419, to a subcarrier. The OFDM modulator 423 converts signals by subcarrier provided from the subcarrier mapper 421 into time-domain signals through an Inverse Fast Fourier Transform (IFFT) operation, inserts a CP, and thus constructs an OFDM symbol. The RF transmitter 425 up converts a baseband signal provided from the OFDM modulator 423 into an RF band signal and transmits the RF band signal through the antenna.

Figure 5:
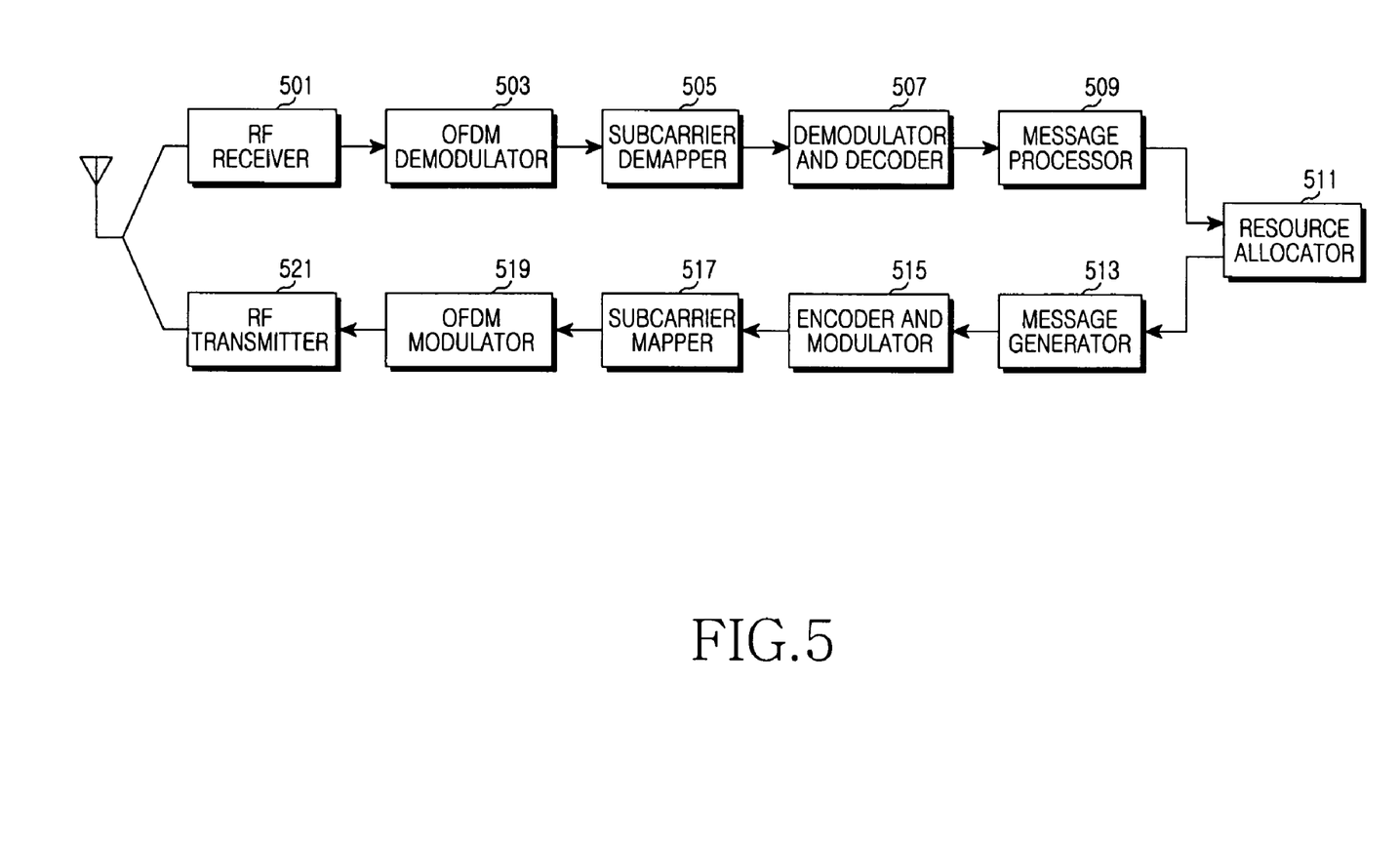
FIG. 5 is a block diagram illustrating a construction of a relay station in a full duplex relay scheme for minimizing interference in a multi-hop relay wireless communication system according to an exemplary embodiment of the present invention.

FIG. 5 is a block diagram illustrating a construction of an RS in a multi-hop relay wireless communication system according to an exemplary embodiment of the present invention.

As shown in FIG. 5, the RS includes an RF receiver 501, an OFDM demodulator 503, a subcarrier demapper 505, a demodulator and decoder 507, a message processor 509, a resource allocator 511, a message generator 513, an encoder and modulator 515, a subcarrier mapper 517, an OFDM modulator 519, and an RF transmitter 521.

The RF receiver 501 down converts an RF band signal received through an antenna into a baseband signal. The OFDM demodulator 503 distinguishes the signal provided from the RF receiver 501 in an OFDM symbol unit, removes a CP, and then restores signals by subcarrier through an FFT operation. The subcarrier demapper 505 extracts signals to be demodulated and decoded among the signals by subcarrier provided from the OFDM demodulator 503. The demodulator and decoder 507 converts the signals into a bit stream by demodulating and decoding the signals provided from the subcarrier demapper 505.

The message processor 509 analyzes messages within the bit stream provided from the demodulator and decoder 507, identifies information included in the message, and provides the identified information to the resource allocator 511. Particularly, the message processor 509 identifies the contents of a flag message received from an MS and provides the identified contents to the resource allocator 511. The flag message is one example of a control message including information for informing interference or non-interference and is a message of one bit having '0' or '1'. However, the flag message can be substituted with a control message of a different type according to another exemplary embodiment of the present invention.

The resource allocator 511 determines the occurrence or non-occurrence of interference using the information provided from the message processor 509. The resource allocator 511 allocates resources for communication with an MS. If interference occurs, the resource allocator 511 reallocates resources to a vacant resource block not allocated by a BS using map information of the BS and, if interference does not occur, keeps allocating given resources. The resource allocator 511 provides a bit stream including the message to the message generator 513. For example, if identifying that interference occurs in a $1^{st}$ channel, the resource allocator 511 allocates a $2^{nd}$ channel that is not allocated by a BS to avoid interference. If identifying that interference does not occur in the $1^{st}$ channel, the resource allocator 511 allocates the $1^{st}$ channel and performs communication.

The message generator 513 generates a message including information provided from the resource allocator 511 and provides a bit stream of the generated message to the encoder and modulator 515. The encoder and modulator 515 converts the bit stream into complex symbols by encoding and modulating the bit stream provided from the message generator 513. The subcarrier mapper 517 maps the complex symbols, which are provided from the encoder and modulator 515, to a subcarrier. The OFDM modulator 519 converts signals by subcarrier provided from the subcarrier mapper 517 into time-domain signals through an IFFT operation, inserts a CP, and constructs an OFDM symbol. The RF transmitter 521 up converts a baseband signal provided from the OFDM modulator 519 into an RF band signal and transmits the RF band signal through the antenna.

Figure 6:
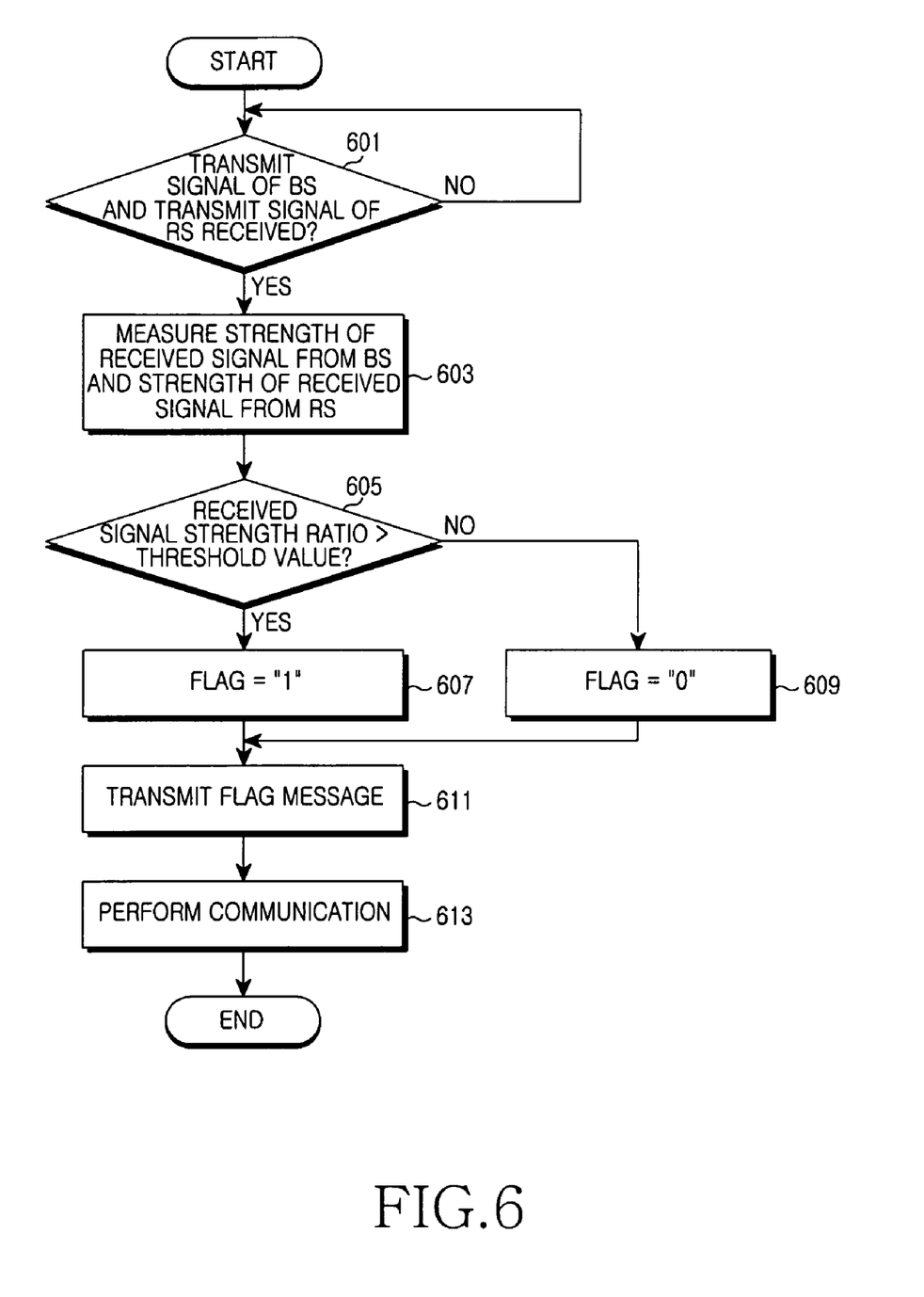
FIG. 6 is a flow diagram illustrating a process of an mobile station in a full duplex relay scheme for minimizing interference in a multi-hop relay wireless communication system according to an exemplary embodiment of the present invention.

FIG. 6 is a flow diagram illustrating an operation process of an MS in a multi-hop relay wireless communication system according to an exemplary embodiment of the present invention.

As shown in FIG. 6, in step 601, the MS identifies if a transmit signal of a BS and a transmit signal of an RS are received.

If the transmit signal of the BS and the transmit signal of the RS are all received, in step 603, the MS measures a strength of the received signal from the BS and a strength of the received signal from the RS.

In step 605, the MS measures a received signal strength ratio of BS to RS using the measured intensities of the received signals and identifies if the received signal strength ratio is equal to or more than a predetermined threshold value. The received signal strength ratio of BS to RS means that the strength of the received signal from the BS is divided by the strength of the received signal from the RS.

If the received signal strength ratio is equal to or more than the threshold value, in step 607, the MS recognizes that interference occurs and sets a value of a flag message to '1'. If the received signal strength ratio is less than the threshold value, in step 609, the MS recognizes that interference does not occur and sets the value of the flag message to '0'.

In step 611, the MS transmits the generated flag message of step 607 or 609 set to '0' or '1' to the RS. Additionally, the flag message can be substituted with a control message of a different type according to another exemplary embodiment of the present invention.

In step 613, the MS performs communication through a channel resource allocated by an RS. The process of FIG. 6 is repeatedly performed every transmit/receive duration.

Figure 7:
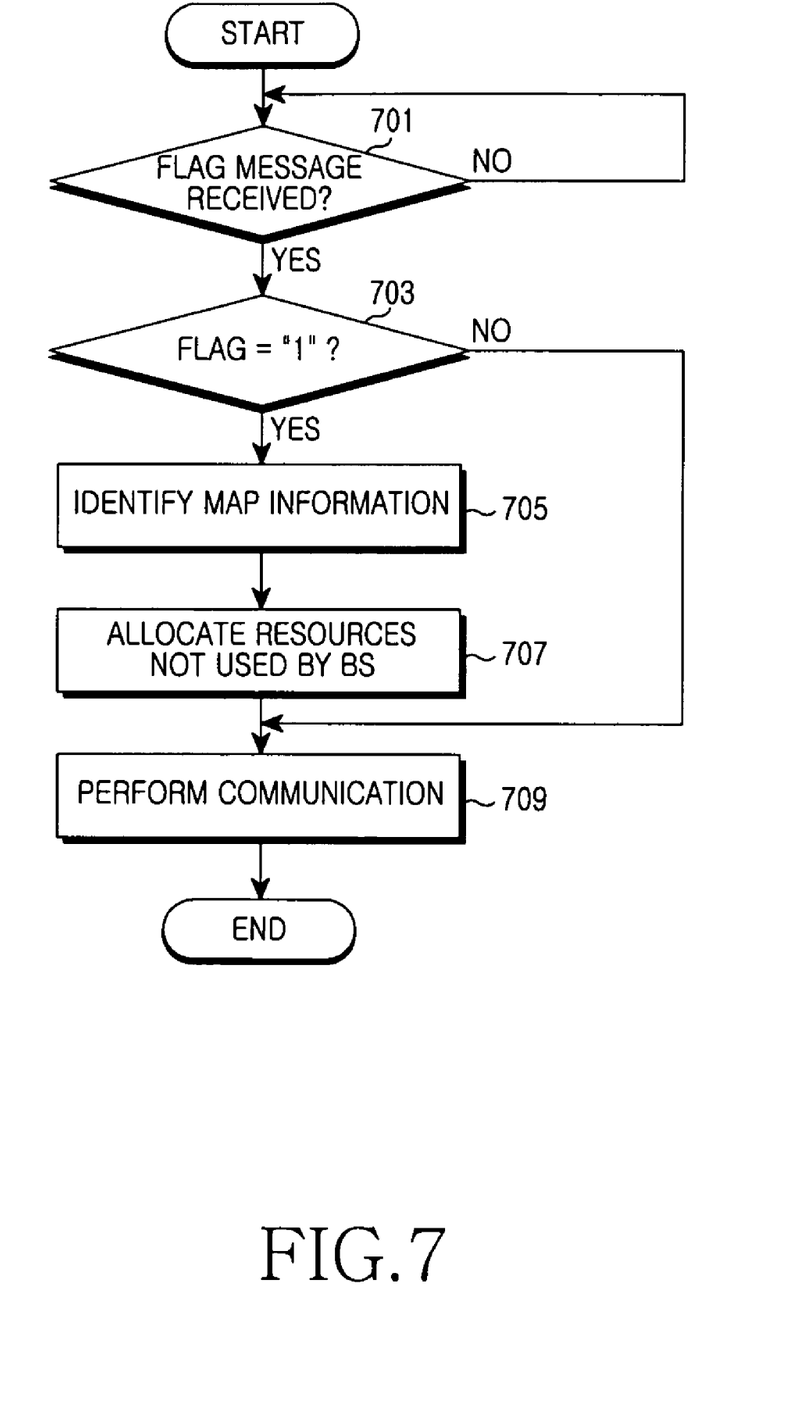
FIG. 7 is a flow diagram illustrating a process of an relay station in a full duplex relay scheme for minimizing interference in a multi-hop relay wireless communication system according to an exemplary embodiment of the present invention.

FIG. 7 is a flow diagram illustrating an operation process of an RS in a multi-hop relay wireless communication system according to an exemplary embodiment of the present invention.

As shown in FIG. 7, in step 701, the RS identifies if it receives a flag message representing if interference occurs. When interference occurs, the flag message is set to '1' and, when interference does not occur, is set to '0'.

If the flag message is received, the RS goes to step 703 and identifies if a value of the flag message is equal to '1'. If the flag message is not received, the RS returns to step 701. If the value of the flag message is equal to '0', the RS recognizes that interference does not occur and, in step 709, performs communication.

If the value of the flag message is equal to '1', the RS recognizes that interference occurs and, in step 705, identifies map information of a BS in order to reallocate channel resources to an MS transmitting the flag message.

In step 707, the RS allocates the MS channel resources not used by the BS among the map information to minimize interference having influence on the MS. For example, if it is identified that interference occurs in a $1^{st}$ channel, the RS allocates resources to a $2^{nd}$ channel that is not used by the BS to avoid the interference.

In step 709, the RS performs communication with the MS using the channel resources allocated to the MS. The process of FIG. 7 is repeatedly performed every transmit/receive duration.

As described above, when using FDR in a multi-hop relay wireless communication system, an exemplary embodiment of the present invention can minimize interference by allowing an MS to determine interference conditions, inform an RS of the interference conditions, and preferentially allocate resources of an RS to a vacant resource of the BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a mobile station in a multi-hop relay wireless communication system, the method comprising:
   measuring a strength of a first received signal from a base station (BS) and a strength of a first received signal from a relay station;
   calculating a received signal strength ratio by dividing the strength of the received signal from the BS by the strength of the received signal from the relay station;
   determining whether interference occurs based on the received signal strength ratio; and
   transmitting a control message representing whether interference occurs; and
   receiving a second signal from the BS over a first channel and a second signal from the relay station over a second channel.

2. The method of claim 1, wherein determining whether interference occurs comprises determining that interference occurs when the received signal strength ratio is not less than a threshold value.

3. The method of claim 1, wherein the control message comprises a one-bit flag message.

4. The method of claim 1 wherein the first received signals were received on the first channel, and transmitting the control message comprises transmitting the control message on the second channel prior to receiving the second signal from the relay station.

5. The method of claim 4, wherein transmitting the control message comprises, when the first received signal from the base station and the first signal received from the relay station are both received on the first channel, selecting a vacant channel that is not allocated by the base station as the second channel prior to transmitting the control message on the second channel.

6. The method of claim 1, wherein the wireless communication system is an orthogonal frequency division multiple access system.

7. A method of operating a relay station in a multi-hop relay wireless communication system, the method comprising:
   determining whether interference occurs based on a control message comprising interference information received from a mobile station;
   allocating vacant resources not used by a base station to the mobile station when interference occurs, wherein allocating the vacant resources comprises:
   identifying the vacant resources by identifying map information of the base station; and
   performing communication with the mobile station through the reallocated resources.

8. The method of claim 7, wherein the control message is a one-bit flag message.

9. The method of claim 7, wherein determining whether interference occurs comprises:
   determining whether the interference occurs on a channel allocated by the base station.

10. The method of claim 7 wherein the reallocated resources comprise a reallocated channel.

11. The method of claim 7, wherein the wireless communication system is an orthogonal frequency division multiple access system.

12. A mobile station apparatus for use in a multi-hop relay wireless communication system, the apparatus comprising:
   a measurer configured to measure a strength of a first received signal from a base station and measure a strength of a first received signal from a relay station;
   a determiner configured to calculate a received signal strength ratio by dividing the strength of the received signal from the base station by the strength of the received signal from the relay station, and determine whether interference occurs using the receive signal strength ratio; and
   a transmitter configured to transmit a control message representing whether interference occurs; and
   a receiver configured to receive a second signal from the base station over a first channel and a second signal from the relay station over a second channel.

13. The apparatus of claim 12, wherein the determiner is further configured to determine that interference occurs when the received signal strength ratio is not less than a threshold value.

14. The apparatus of claim 12, therein the control message is a one-bit flag message.

15. The apparatus of claim 12 wherein the first received signals are received on the first channel, and the transmitter is further configured to transmit the control message over the second channel prior to receiving the second signal from the relay station.

16. The apparatus of claim 15 wherein the first resource comprises a first channel and the second resource comprises a second channel wherein the determiner is further configured to select a vacant channel that is not allocated by the base station as the second channel prior to transmitting the control message on the second channel when the first received signal from the base station and the first signal received from the relay station are both received on the first channel.

17. A relay station apparatus for use in a multi-hop relay wireless communication system, the apparatus comprising:
   an allocator configured to determine whether interference occurs based on a control message comprising interference information received from a mobile station, identify vacant resources through map information of a base station, and allocate the vacant resources not used by the base station to the mobile station when interference occurs; and
   a transmitter configured to transmit a signal to the mobile station through the reallocated resources.

18. The apparatus of claim 17, wherein the control message is a one-bit flag message.

19. The apparatus of claim 17, wherein the allocator is further configured to determine whether the interference occurs on a channel allocated by the base station.

20. The apparatus of claim 17 wherein the reallocated resources comprise a reallocated channel.

* * * * *